United States Patent
Chen

(10) Patent No.: US 10,855,189 B2
(45) Date of Patent: Dec. 1, 2020

(54) CONTROL APPARATUS FOR RESONANT CONVERTER

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 0 days.

(21) Appl. No.: 16/801,716

(22) Filed: Feb. 26, 2020

(65) Prior Publication Data

US 2020/0195151 A1 Jun. 18, 2020

Related U.S. Application Data

(63) Continuation of application No. PCT/JP2019/002019, filed on Jan. 23, 2019.

(30) Foreign Application Priority Data

Mar. 23, 2018 (JP) .................................. 2018-055895

(51) Int. Cl.
H02M 3/335 (2006.01)

(52) U.S. Cl.
CPC ... *H02M 3/33507* (2013.01); *H02M 3/33592* (2013.01)

(58) Field of Classification Search
CPC .......... H02M 3/24; H02M 3/28; H02M 3/335; H02M 3/33507; H02M 3/33523;
(Continued)

(56) References Cited

U.S. PATENT DOCUMENTS 6,038,141 A * 3/2000 Ochiai ................. H02M 3/337
363/16
8,824,170 B2 * 9/2014 Kuwabara ........... H02M 3/3376
363/21.02
(Continued)

FOREIGN PATENT DOCUMENTS

EP 3062433 A1 8/2016
JP 2005-210759 A 8/2005
(Continued)

OTHER PUBLICATIONS

International Search Report for PCT/JP2019/002019, dated Apr. 9, 2019.
Written Opinion for PCT/JP2019/002019, dated Apr. 9, 2019.

*Primary Examiner* — Matthew V Nguyen
(74) *Attorney, Agent, or Firm* — Rabin & Berdo, P.C.

(57) ABSTRACT

A control apparatus for a resonant converter that receives a direct current (DC) voltage of a bulk capacitor. The control apparatus includes a forced turn-off control circuit that receives a resonance current detection signal, which has been produced by shunting a resonance current flowing through the resonant converter and converting the shunted resonance current to a voltage, outputs a forced turn-off signal in response to the resonance current detection signal falling between a first variable threshold and a second variable threshold that is smaller than the first variable threshold, and varies the first variable threshold and the second variable threshold in accordance with an input voltage inputted to the forced turn-off control circuit by dividing the DC voltage of the bulk capacitor.

7 Claims, 9 Drawing Sheets

(58) Field of Classification Search
CPC ......... H02M 3/33569; H02M 3/33592; H02M 2001/0058
See application file for complete search history.

(56) References Cited

U.S. PATENT DOCUMENTS

| | | |
|---|---|---|
| 9,385,614 B2 * | 7/2016 | Chen ................. H02M 3/33515 |
| 2005/0157522 A1 | 7/2005 | Osaka |
| 2013/0308347 A1 | 11/2013 | Sato et al. |
| 2015/0016152 A1 | 1/2015 | Kojima |
| 2015/0263602 A1 | 9/2015 | Drda et al. |
| 2015/0263631 A1 * | 9/2015 | Matsuura .......... H02M 3/33576 363/21.02 |
| 2017/0373604 A1 * | 12/2017 | Chen ....................... H02M 1/36 |

FOREIGN PATENT DOCUMENTS

| | | | |
|---|---|---|---|
| JP | 2006-174571 A | 6/2006 | |
| JP | 4386743 B2 | 12/2009 | |
| JP | 2015-019534 A | 1/2015 | |
| JP | 5761206 B2 | 8/2015 | |
| JP | 2016-163386 A | 9/2016 | |
| JP | 2017229209 | * 12/2017 | .............. H02M 1/36 |

* cited by examiner

CONTROL APPARATUS FOR RESONANT CONVERTER

CROSS-REFERENCE TO RELATED APPLICATION

This application is a continuation application of International Application PCT/JP2019/002019 filed on Jan. 23, 2019 which designated the U.S., which claims priority to Japanese Patent Application No. 2018-055895, filed on Mar. 23, 2018, the entire contents of which are incorporated herein by reference.

BACKGROUND OF THE INVENTION

1. Field of the Invention

The embodiments discussed herein relates to a control apparatus for a resonant converter.

2. Background of the Related Art

Current resonance-type DC-DC converters achieve high efficiency and may be miniaturized, which has resulted in widespread use in LCD televisions, AC-DC adapters, and the like. A current resonance-type DC-DC converter suppresses a harmonic current generated by switching operations to a given limit value or below, and is used in combination with a power factor correction circuit that improves the power factor. The power factor correction circuit generates a DC intermediate voltage that is boosted from the AC input voltage, and the DC-DC converter converts this intermediate voltage into a DC voltage of a predetermined value.

A large-capacity bulk capacitor is provided between the power factor correction circuit and the DC-DC converter. The intermediate voltage generated by the power factor correction circuit is accumulated in the bulk capacitor. This intermediate voltage stored in the bulk capacitor is then used as the input voltage of the DC-DC converter. The DC-DC converter converts this input voltage and supplies the resulting voltage to a load.

Here, when the supplying of an AC input voltage to the power factor correction circuit stops due to a power plug being accidentally removed from a socket for example, the supplying of energy from the power factor correction circuit to the bulk capacitor stops. In this situation, the energy inputted into the DC-DC converter will be only the energy that has been stored in the bulk capacitor. This means that the intermediate voltage across the terminals of the bulk capacitor will fall.

In a DC-DC converter, when the input voltage falls, a so-called "off-resonance" state may result and the switching elements may be destroyed. That is, in a current resonance-type DC-DC converter, a half-bridge circuit in which high-side and low-side switching elements are connected in series is used, and the current-resonance circuit is driven by alternately turning on the high-side and low-side switching elements. In a current resonance-type DC-DC converter, when the input voltage falls, control is performed to lower the switching operating frequency in order to maintain a predetermined output voltage. This means that the switching cycle becomes longer. As a result, a situation may occur where the on-time of a switching element is too long, resulting in an off-resonance state where the resonance current inverts during the on-time and a large current flows the next time switching is performed. As one example, consider a case where the high-side switching element is switched from on to off. When turning off is performed by a normal operation, the direction of the resonance current will be the reverse direction to the forward direction of a body diode connected in antiparallel to the high-side switching element (when the switching element is a MOSFET (Metal-Oxide-Semiconductor Field-Effect Transistor)). In other words, the switching element is turned off in a state where no current will be flowing through the body diode. However, when the switching period becomes too long and the resonance current inverts during the on time of the switching element, a current will end up flowing through the body diode. When the on/off states of the high-side and low-side switching elements are reversed while a current is flowing through the body diode, a reverse recovery operation of the high-side body diode will commence and a reverse recovery current of the diode will flow to the low-side switching element that has turned on, resulting in a large current (through current) flowing instantaneously between the power supply and ground. When the current flowing at this time exceeds the rating of the switching elements, the switching elements may break.

For this reason, in a DC-DC converter, when the input voltage falls, switching operations are stopped to protect the switching elements before an off-resonance state occurs (see, for example, Japanese Patent No. 4,386,743 and Japanese Patent No. 5,761,206).

According to the off-resonance preventing technology disclosed in Japanese Patent No. 4,386,743, the resonance current is monitored, and when the resonance current exceeds a first threshold, a forced turn-off of the DC-DC converter is permitted, and when the resonance current subsequently falls below the second threshold, forced turning off of the DC-DC converter is executed. This reliably prevents an off-resonance state of the DC-DC converter before the resonance current inverts.

According to Japanese Patent No. 5,761,206, the resonance current and the resonance voltage are monitored, polarity inversion of the resonance current is determined based on the resonance voltage, and a forced turn-off of the DC-DC converter is permitted. When the resonance current subsequently falls below a predetermined current threshold, a forced turn-off of the DC-DC converter is executed. This reliably prevents an off-resonance state of the DC-DC converter before the resonance current inverts.

It is desirable for a DC-DC converter to be able to supply a DC voltage to the load for as long as possible when the power supplied from the power factor correction circuit is lost. This is because when power is lost, time called "usable time" is needed to backup data before the load, such as a data processing apparatus, shuts down. In order to achieve sufficient usable time, a system is configured so that the intermediate voltage of the bulk capacitor may be used to the lowest possible voltage or so that the capacity of the bulk capacitor is increased.

In order for the DC-DC converter to use the intermediate voltage of a bulk capacitor to the lowest possible voltage, the threshold of the resonance current at which a forced turn-off is executed may be set low. However, with a configuration where the threshold of the resonance current for executing the forced turn-off is set low, when the input voltage is high, the rate of change (dI/dt) in the resonance current will increase, which makes it difficult to prevent off-resonance. On the other hand, when the threshold of the resonance current for executing the forced turn-off is set high, a forced turn-off will be executed before the input voltage has fallen, so that the usable time is shortened and there is a corresponding drop in the energy of the bulk capacitor that is used effectively. That is, when the threshold of the resonance current is set low, it is difficult to prevent off-resonance, and when the threshold of the resonance current is set high, it is difficult to achieve a sufficient usable time. For this reason, it is preferable to increase the capacity of the bulk capacitor to achieve sufficient usable time, but there has been the problem of an increase in the component cost of the bulk capacitor.

SUMMARY OF THE INVENTION

According to an aspect, there is provided a control apparatus for a resonant converter that receives a direct current (DC) voltage of a bulk capacitor. The control apparatus includes a forced turn-off control circuit that receives a resonance current detection signal, which has been produced by shunting a resonance current flowing through the resonant converter and converting the shunted resonance current to a voltage, outputs a forced turn-off signal in response to the resonance current detection signal falling between a first variable threshold and a second variable threshold that is smaller than the first variable threshold, and varies the first variable threshold and the second variable threshold in accordance with an input voltage inputted to the forced turn-off control circuit by dividing the DC voltage of the bulk capacitor.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Several embodiments will be described below with reference to the accompanying drawings. Note that in the following description, the same character strings may be used both for the names of terminals in a circuit and voltages, signals, and the like at these terminals.

Figure 1:
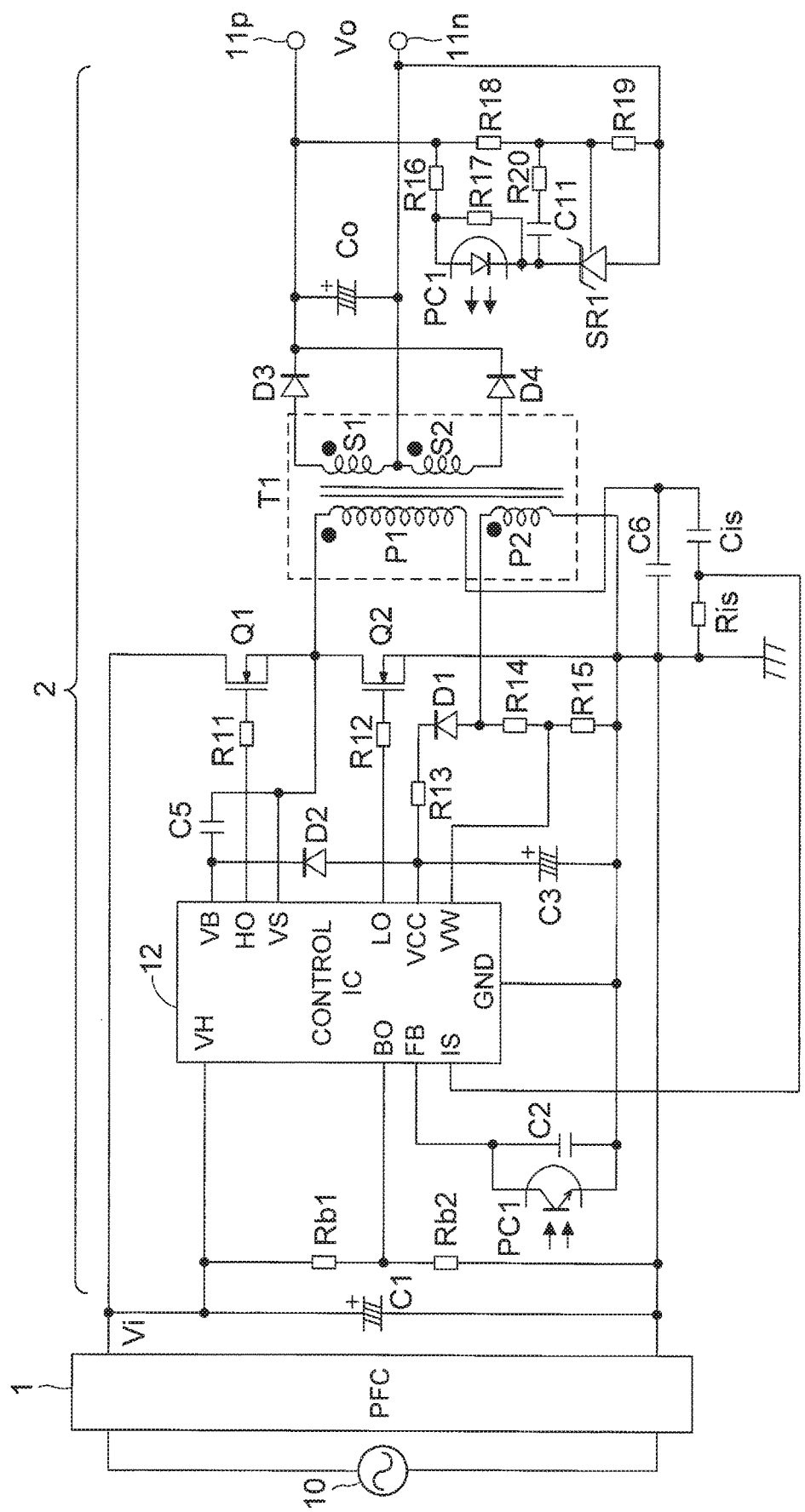
FIG. 1 is a circuit diagram depicting an example configuration of a switching power supply including a DC-DC converter to which a control apparatus according to an embodiment has been applied.
Figure 2:
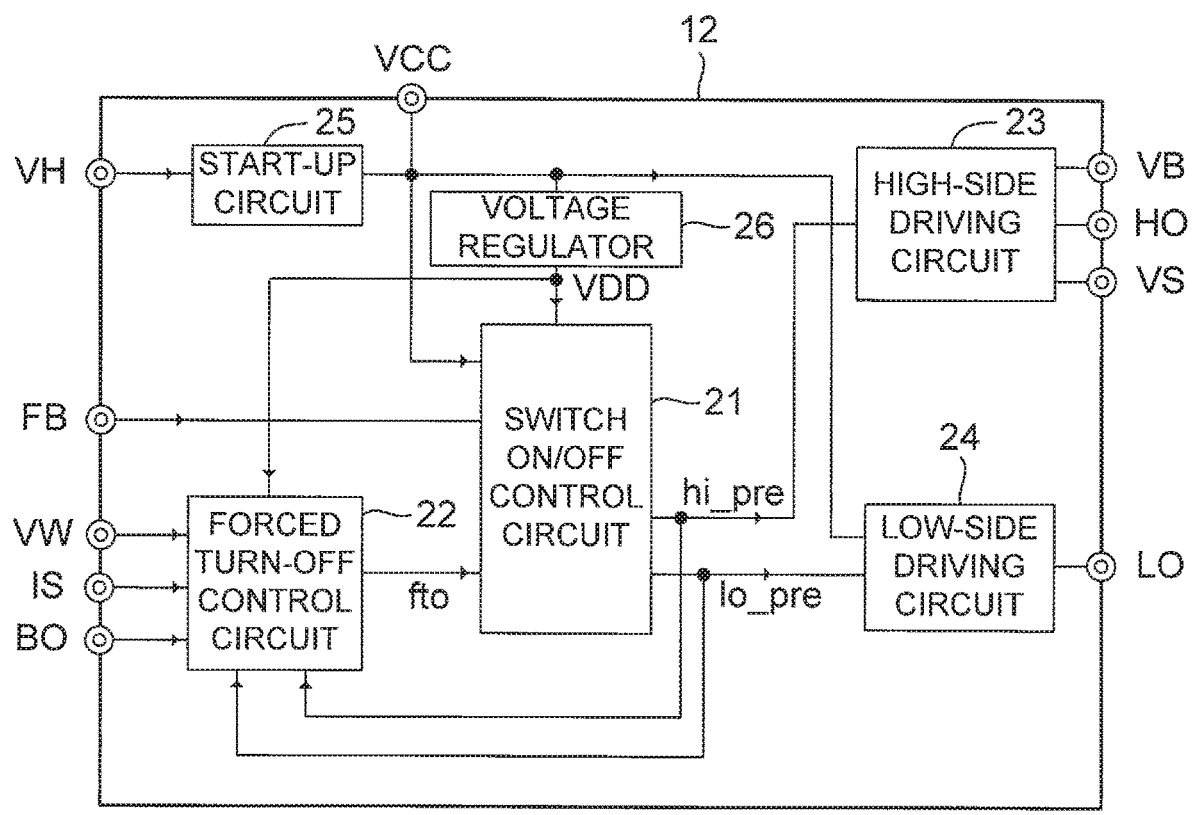
FIG. 2 is a functional block diagram depicting an example configuration of a control apparatus for a resonant converter according to the present embodiment.

FIG. 1 is a circuit diagram depicting an example configuration of a switching power supply including a DC-DC converter to which a control apparatus according to an embodiment has been applied, and FIG. 2 is a functional block diagram depicting an example configuration of a control apparatus for a resonant converter according to the present embodiment.

The switching power supply according to the present embodiment includes a power factor correction circuit (PFC) 1 and a DC-DC converter 2, with a bulk capacitor C1 being disposed between the power factor correction circuit 1 and the DC-DC converter 2.

An AC power supply 10 is connected to input terminals of the power factor correction circuit 1 and the bulk capacitor C1 is connected to output terminals of the power factor correction circuit 1. The power factor correction circuit 1 rectifies and boosts the inputted AC voltage to generate a DC voltage Vi as a charging voltage for the bulk capacitor C1. This DC voltage Vi serves as a DC input voltage of the DC-DC converter 2.

In the DC-DC converter 2, the positive electrode terminal and the negative electrode terminal of the bulk capacitor C1 are connected to a half-bridge circuit in which a high-side switching element Q1 and a low-side switching element Q2 are connected in series. In this embodiment, the switching elements Q1 and Q2 use N-channel MOSFETs.

A connection point between the switching elements Q1 and Q2 is connected to one terminal of a primary winding P1 of a transformer T1, and the other terminal of the primary winding P1 is connected to ground via a resonant capacitor C6. In this configuration, the leakage inductance component of the transformer T1 and a resonant capacitor C6 form a resonance circuit. Note that instead of using the leakage inductance, an inductor that is separate from the inductance forming the transformer T1 may be connected in series to the resonant capacitor C6 and this inductor may be used as the resonant reactance of the resonance circuit.

One terminal of a secondary winding S1 of the transformer T1 is connected to the anode terminal of a diode D3, and one terminal of a secondary winding S2 is connected to the anode terminal of a diode D4. The cathode terminals of the diodes D3 and D4 are both connected to a positive electrode terminal of an output capacitor Co and an output terminal 11p. A negative electrode terminal of the output capacitor Co is connected to a connection point between the secondary windings S1 and S2 and an output terminal 11n. The secondary windings S1 and S2, the diodes D3 and D4, and the output capacitor Co form an output circuit of the DC-DC converter 2 that rectifies and smoothes the AC voltages generated in the secondary windings S1 and S2 to convert the AC voltages into a DC output voltage Vo.

A control IC (Integrated Circuit) 12 is a control unit that controls the DC-DC converter 2. The control IC 12 has a VH terminal connected to the positive electrode terminal of the bulk capacitor C1, a GND terminal connected to ground, and a BO terminal that detects an input DC voltage Vi. The BO terminal is connected to one terminal of a resistor Rb1 and one terminal of a resistor Rb2, the other terminal of the resistor Rb1 is connected to a positive electrode terminal of the bulk capacitor C1, and the other terminal of the resistor Rb2 is connected to the negative electrode terminal of the bulk capacitor C1. The resistors Rb1 and Rb2 form a voltage divider circuit that divides the input DC voltage Vi and supplies the divided voltage to the BO terminal.

The control IC 12 also has an HO terminal connected via a resistor R11 to the gate terminal of the switching element Q1 and an LO terminal connected via a resistor R12 to the gate terminal of the switching element Q2. In addition, the control IC 12 includes a VB terminal that is a high-side power supply terminal, a VS terminal that is a high-side reference potential terminal, a VCC terminal for supplying power to the control IC 12, a VW terminal for detecting a resonance voltage, an FB terminal to which information on the output voltage Vo is fed back, and an IS terminal for detecting a resonance current.

A capacitor C5 is connected between the VB terminal and the VS terminal of the control IC 12. The VS terminal is connected to a connection point between the switching elements Q1 and Q2. The VCC terminal is connected to a positive electrode terminal of a capacitor C3, and a negative electrode terminal of the capacitor C3 is connected to the ground. The VCC terminal is also connected to the anode terminal of a diode D2, and the cathode terminal of the diode D2 is connected to the VB terminal. The VCC terminal is also connected to one terminal of a current limiting resistor R13, and the other terminal of the resistor R13 is connected to the cathode terminal of a diode D1. The anode terminal of the diode D1 is connected to one terminal of an auxiliary winding P2 of the transformer T1, and the other terminal of the auxiliary winding P2 is connected to ground. With this configuration, after the DC-DC converter 2 starts up, the capacitor C3 accumulates the current induced in the auxiliary winding P2 and serves as a power source for the control IC 12.

One terminal of the auxiliary winding P2 of the transformer T1 is also connected to one terminal of a resistor R14, the other terminal of the resistor R14 is connected to one terminal of a resistor R15, and the other terminal of the resistor R15 is connected to ground. A connection point between the resistor R14 and the resistor R15 is connected to the VW terminal of the control IC 12, and a resonance voltage detection signal is supplied to the VW terminal. A connection point between the other terminal of the primary winding P1 of the transformer T1 and the resonant capacitor C6 is connected to one terminal of a capacitor Cis, and the other terminal of the capacitor Cis is connected to one terminal of a resistor Ris. The other terminal of the resistor Ris is connected to ground. A connection point between the capacitor Cis and the resistor Ris is connected to the IS terminal of the control IC 12. With this configuration, the resonance current flowing through the resonant capacitor C6 is shunted by a series circuit composed of the capacitor Cis and the resistor Ris and the shunted current is converted by the resistor Ris to a voltage, which is supplied to the IS terminal of the control IC 12 as a resonance current detection signal.

A positive electrode terminal of the output capacitor Co is connected via a resistor R16 to the anode terminal of the light emitting diode of the photocoupler PC1, and the cathode terminal of the light emitting diode is connected to the cathode terminal of a shunt regulator SR1. A resistor R17 is connected between the anode terminal and the cathode terminal of the light emitting diode. The anode terminal of the shunt regulator SR1 is connected to the output terminal 11n. The shunt regulator SR1 has a reference terminal connected to a connection point between resistors R18 and R19 connected in series between the positive electrode terminal and the negative electrode terminal of the output capacitor Co. A series circuit composed of a resistor R20 and a capacitor C11 is connected between the reference terminal and a cathode terminal of the shunt regulator SR1. The shunt regulator SR1 sends a current in keeping with a difference between a potential obtained by dividing the output voltage Vo (that is, the voltage across the output capacitor Co) using the resistors R18 and R19 and an internal reference voltage to the light-emitting diode of the photocoupler PC1. As a result, a current equivalent to an error with respect to a target voltage for the output voltage Vo flows through the light-emitting diode. The phototransistor of the photocoupler PC1 has a collector terminal connected to the FB terminal of the control IC 12 and an emitter terminal connected to ground. A capacitor C2 is also connected between the collector terminal and the emitter terminal. Note that the FB terminal is pulled up to an internal reference voltage (not illustrated) via a resistor (also not illustrated).

As depicted in FIG. 2, the control IC 12 includes a switch on/off control circuit 21, a forced turn-off control circuit 22, a high-side driving circuit 23, a low-side driving circuit 24, a start-up circuit 25, and a voltage regulator 26.

The VH terminal of the control IC 12 is connected to the input terminal of the start-up circuit 25, and the output terminal of the start-up circuit 25 is connected to the VCC terminal, the switch on/off control circuit 21, the low-side driving circuit 24, and the voltage regulator 26. The voltage regulator 26 generates a voltage VDD of an internal power supply and supplies the voltage VDD to the switch on/off control circuit 21 and the forced turn-off control circuit 22.

The FB terminal is connected to an input terminal of the switch on/off control circuit 21, and a high-side output terminal of the switch on/off control circuit 21 is connected to an input terminal of the high-side driving circuit 23 so as to supply a high-side driving signal hi_pre. A low-side output terminal of the switch on/off control circuit 21 is connected to an input terminal of the low-side driving circuit 24 so as to supply a low-side driving signal lo_pre. An output terminal of the high-side driving circuit 23 is connected to the HO terminal, and an output terminal of the low-side driving circuit 24 is connected to the LO terminal. The high-side driving circuit 23 is also connected to the VB terminal as the high-side power supply and the VS terminal that serves as the high-side reference potential.

The VW terminal, the IS terminal, and the BO terminal are connected to input terminals of the forced turn-off control circuit 22, and an output terminal of the forced turn-off control circuit 22 is connected to an input terminal of the switch on/off control circuit so as to supply a forced turn-off signal fto. The forced turn-off control circuit 22 is also connected to the high-side output terminal and the low-side output terminal of the switch on/off control circuit 21 and receives the high-side driving signal hi_pre and the low-side driving signal lo_pre.

With this DC-DC converter 2, when the charging voltage of the bulk capacitor C1 increases, the control IC 12 first operates the start-up circuit 25 to have a current for charging the capacitor C3 outputted from the output terminal of the start-up circuit 25. This current charges, via the VCC terminal, the capacitor C3 connected to the VCC terminal to generate the voltage VCC. A constant voltage VDD is then generated from the voltage VCC by the voltage regulator 26 and is supplied to the switch on/off control circuit 21 and the forced turn-off control circuit 22. When the voltage VCC and the voltage VDD have been established and the DC-DC converter 2 starts a switching operation, the voltage at the VCC terminal is maintained by a current supplied from the auxiliary winding P2 of the transformer T1.

The switch on/off control circuit 21 receives information on the output voltage Vo inputted into the FB terminal, controls the ON widths of the high-side driving signal hi_pre and the low-side driving signal lo_pre, and controls the output voltage Vo to become a predetermined constant value.

The forced turn-off control circuit 22 receives an input voltage detection signal at the BO terminal, receives the resonance voltage detection signal at the VW terminal, and receives a resonance current detection signal at the IS terminal. The resonance voltage detection signal inputted into the VW terminal specifies the direction in which the resonance current is changing (either an increasing direction or decreasing direction), and the resonance current detection signal inputted into the IS terminal determines the timing for a forced turning off of the high-side driving signal hi_pre and the low-side driving signal lo_pre. The input voltage detection signal at the BO terminal determines thresholds for turning off the high-side driving signal hi_pre and the low-side driving signal lo_pre.

The forced turn-off control circuit 22 is configured so that when the signal at the VW terminal is decreasing and has fallen below a first fixed threshold and the signal at the IS terminal has also fallen below a first variable threshold, the high-side driving signal hi_pre is turned off. The forced turn-off control circuit 22 is also configured so that when the signal at the VW terminal is increasing and has risen to exceed a second fixed threshold that is smaller than the first fixed threshold and the signal at the IS terminal has also risen to exceed a second variable threshold that is smaller than the first variable threshold, the low-side driving signal lo_pre is turned off. Here, the first variable threshold and the second variable threshold are changed depending on the value of the input voltage detection signal at the BO terminal, that is, the value of the input DC voltage Vi, and so are set higher when the DC voltage Vi is higher and are set lower when the DC voltage Vi is low. Note that the range for setting the first variable threshold and the second variable threshold at low values is a range where the DC-DC converter 2 maintains a predetermined output voltage Vo. This means that when the DC voltage Vi is high, the first variable threshold and the second variable threshold are set high, which makes it possible to reliably prevent off-resonance. On the other hand, when the DC voltage Vi falls, the first variable threshold and the second variable threshold are set lower, which increases the time taken for the signal at the IS terminal to reach the first variable threshold and the second variable threshold. Since this causes a corresponding extension in the time before a forced turn-off is executed, the usable time may be lengthened.

Next, specific example configurations of the forced turn-off control circuit 22 and the switch on/off control circuit 21 will be described.

Figure 3:
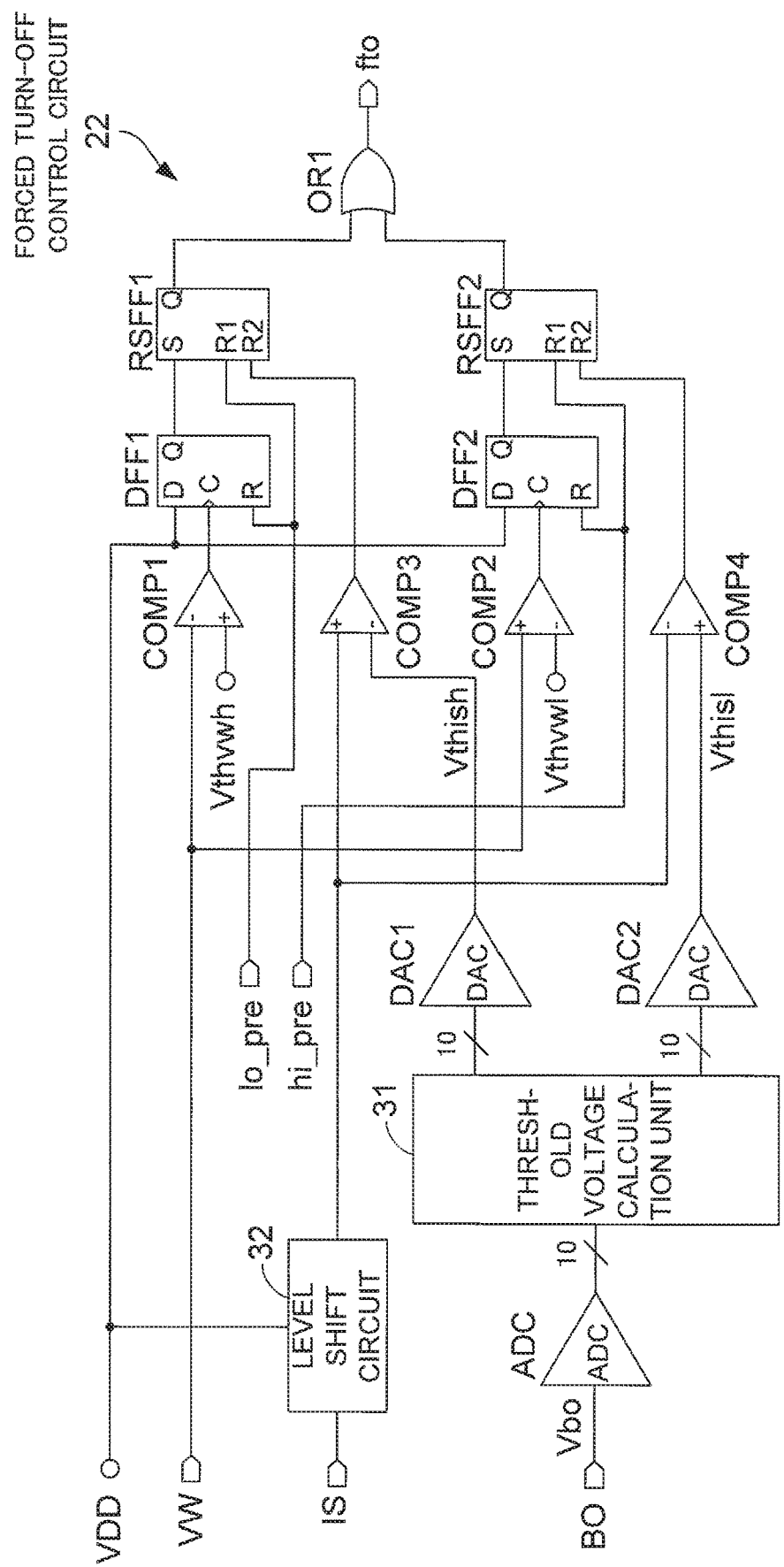
FIG. 3 is a circuit diagram depicting an example configuration of a forced turn-off control circuit.
Figure 4:
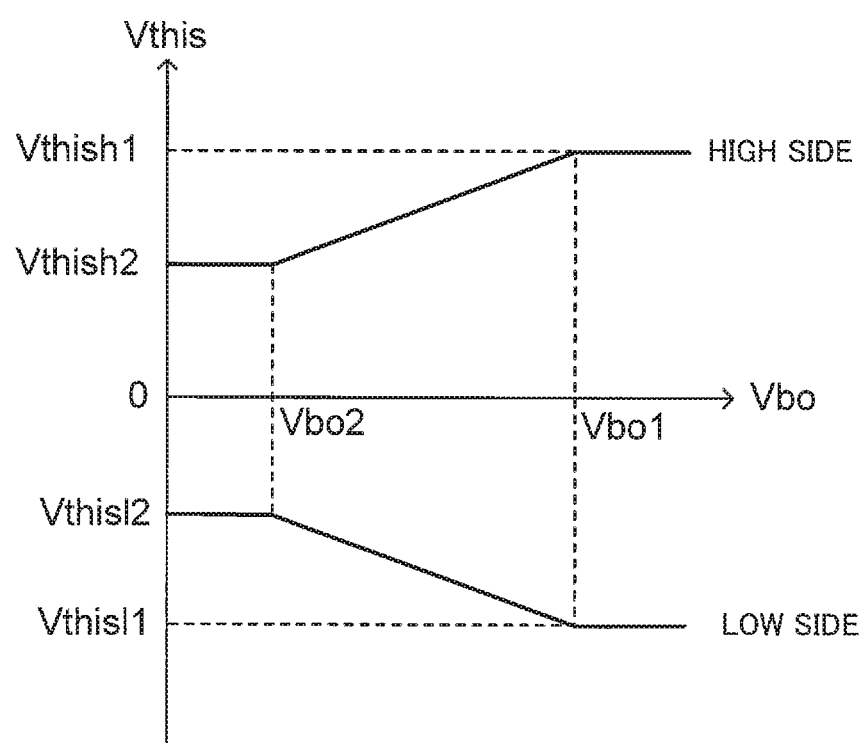
FIG. 4 depicts the input/output relationship of a threshold voltage calculation unit of the forced turn-off control circuit.
Figure 5:
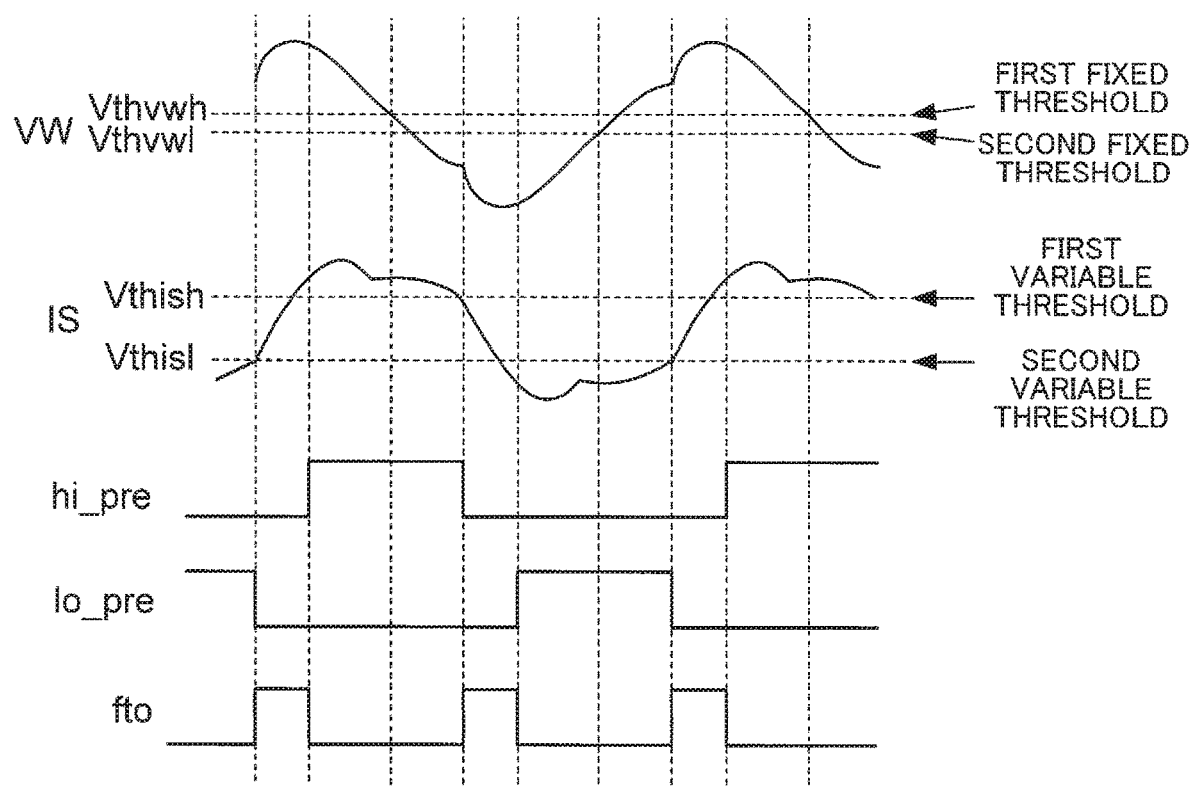
FIG. 5 is a timing chart for generation of a forced turn-off signal.

FIG. 3 is a circuit diagram depicting an example configuration of the forced turn-off control circuit, FIG. 4 depicts the input/output relationship of a threshold voltage calculation unit of the forced turn-off control circuit, and FIG. 5 is a timing chart for generation of a forced turn-off signal.

As depicted in FIG. 3, in the forced turn-off control circuit 22, the VW terminal is connected to the inverting input terminal of a comparator COMP1 and a non-inverting input terminal of a comparator COMP2. A fixed threshold voltage Vthvwh (or "first fixed threshold") for the high side is applied to a non-inverting input terminal of the comparator COMP1, and an output terminal of the comparator COMP1 is connected to a clock input terminal C of the delay flip-flop (D flip-flop) DFF1. A fixed threshold voltage Vthvwl (or "second fixed threshold") for the low side is applied to an inverting input terminal of the comparator COMP2, and an output terminal of the comparator COMP2 is connected to a clock input terminal C of the D flip-flop DFF2.

The voltage VDD of the internal power supply is applied to input terminals D of the D flip-flops DFF1 and DFF2. An output terminal Q of the D flip-flop DFF1 is connected to a set input terminal S of a reset priority RS flip-flop RSFF1. An output terminal Q of the D flip-flop DFF2 is connected to a set input terminal S of a reset priority RS flip-flop RSFF2. The low-side driving signal lo_pre outputted by the switch on/off control circuit 21 is inputted into a reset input terminal R of the D flip-flop DFF1 and a first reset input terminal R1 of the RS flip-flop RSFF1. The high-side driving signal hi_pre outputted by the switch on/off control circuit 21 is inputted into a reset input terminal R of the D flip-flop DFF2 and a first reset input terminal R1 of the RS flip-flop RSFF2.

The IS terminal is connected via a level shift circuit 32 to a non-inverting input terminal of a comparator COMP3 and an inverting input terminal of a comparator COMP4. Note that until later in this specification, the level shift circuit 32 is regarded as not existing. Accordingly, the description given below assumes that the output signal of the level shift circuit is the same as the voltage at the IS terminal. An output terminal of the comparator COMP3 is connected to a second reset input terminal R2 of the RS flip-flop RSFF1, and an output terminal of the comparator COMP4 is connected to a second reset input terminal R2 of the RS flip-flop RSFF2.

Threshold voltages Vthish (the "first variable threshold") and Vthisl (the "second variable threshold") that vary according to the DC voltage Vi are respectively inputted into an inverting input terminal of the comparator COMP3 and a non-inverting input terminal of the comparator COMP4. In other words, the BO terminal is connected to an input terminal of the analog/digital converter ADC, and the output terminal of the analog/digital converter ADC is connected to an input terminal of the threshold voltage calculation unit 31. A high-side output terminal of the threshold voltage calculation unit 31 is connected to an input terminal of a digital/analog converter DAC1, and a low-side output terminal of the threshold voltage calculation unit 31 is connected to an input terminal of a digital/analog converter DAC2. An output terminal of the digital/analog converter DAC1 is connected to an inverting input terminal of the comparator COMP3, and an output terminal of the digital/analog converter DAC2 is connected to a non-inverting input terminal of the comparator COMP4. Note that in this embodiment, the analog/digital converter ADC and the digital/analog converters DAC1 and DAC2 have a resolution of 10 bits.

Output terminals Q of the RS flip-flops RSFF1 and RSFF2 are both connected to input terminals of an OR circuit OR1, and the output terminal of the OR circuit OR1 is connected to an output terminal of the forced turn-off control circuit 22 that outputs the forced turn-off signal fto.

Here, the threshold voltage calculation unit 31 calculates, according to the relationship depicted in FIG. 4, the high-side threshold voltage Vthish and the low-side threshold voltage Vthisl from a voltage Vbo inputted into the BO terminal. In FIG. 4, the horizontal axis represents the voltage Vbo obtained by dividing the DC voltage Vi with the voltage divider circuit that uses the resistors Rb1 and Rb2, and the vertical axis represents threshold voltages Vthis that are compared with the resonance current and are calculated by the threshold voltage calculation unit 31. Here, the expression "threshold voltages Vthis" is a collective name for the threshold voltage Vthish and the threshold voltage Vthisl.

When the voltage Vbo is in a predetermined voltage range, the threshold voltage calculation unit outputs threshold voltages Vthis that vary in accordance with the voltage Vbo. Outside this predetermined voltage range, the threshold voltage calculation unit 31 outputs threshold voltages Vthis that do not vary.

That is, when the voltage Vbo is in a relationship such that Vbo2<Vbo<Vbo1, the high-side threshold voltage Vthish is as follows.

$$Vthish = \frac{Vthish1 - Vthish2}{Vbo1 - Vbo2} \cdot Vbo + \frac{Vthish2 \cdot Vbo1 - Vthish1 \cdot Vbo2}{Vbo1 - Vbo2} \quad (1)$$

When the voltage Vbo is such that Vbo≥Vbo1, $$Vthish=Vthish1 \quad (2)$$

When the voltage Vbo is such that Vbo≤Vbo2, $$Vthish=Vthish2 \quad (3)$$

On the other hand, when the voltage Vbo is in a relationship such that Vbo2<Vbo<Vbo1, the low-side threshold voltage Vthisl is as follows.

$$Vthisl = \frac{Vthisl1 - Vthisl2}{Vbo1 - Vbo2} \cdot Vbo + \frac{Vthisl2 \cdot Vbo1 - Vthisl1 \cdot Vbo2}{Vbo1 - Vbo2} \quad (4)$$

When the voltage Vbo is such that Vbo≥Vbo1, $$Vthisl=Vthisl1 \quad (5)$$

When the voltage Vbo is such that Vbo≤Vbo2, $$Vthisl=Vthisl2 \quad (6)$$

Here, to give numeric examples for the DC voltage Vi, Vbo1 corresponds to 400 volts (V) that is the specified voltage, and Vbo2 corresponds to 260V for when the voltage has fallen due to the power supply being lost. The absolute values of the high-side threshold voltage Vthish1 and the low-side threshold voltage Vthisl1 are 1V, and the absolute values of the high-side threshold voltage Vthish2 and the low-side threshold voltage Vthisl2 are 0.5V. By doing so, the threshold voltage Vthis for comparison with the resonance current is set high when the DC voltage Vi is high and is set low when the DC voltage Vi is low.

Next, the operation of the forced turn-off control circuit 22 with the configuration described above will be described with reference to FIG. 5. In FIG. 5, the threshold voltages Vthvwh and Vthvwl used for comparison with the resonance voltage signal are fixed values, and the threshold voltages Vthish and Vthisl for comparison with the resonance current signal have variable values calculated by the threshold voltage calculation unit 31.

First, when the high-side driving signal hi_pre is at a high (H) level and the low-side driving signal lo_pre is at a low (L) level, the resonance current detection signal at the IS terminal is higher than the high-side threshold voltage Vthish. Accordingly, the comparator COMP3 outputs an H level signal and resets the RS flip-flop RSFF1, and the D flip-flop DFF2 and the RS flip-flop RSFF2 are reset by the high-side driving signal hi_pre.

Here, when the resonance voltage detection signal at the VW terminal falls below the threshold voltage Vthvwh, the output terminal of the comparator COMP1 becomes the H level. As a result, since the signal inputted into the clock input terminal C rises, the D flip-flop DFF1 latches the voltage VDD (an H level signal) at the timing of this rise and outputs an H level signal at the output terminal Q. Although this H level signal is inputted into the set input terminal S of the RS flip-flop RSFF1, since the RS flip-flop RSFF1 is preferentially reset by the output signal of the comparator COMP3, the output terminal Q of the RS flip-flop RSFF1 remains at the L level. Since the RS flip-flop RSFF2 is also reset by the high-side driving signal hi_pre, the output terminal Q of the RS flip-flop RSFF2 remains at the L level. Accordingly, the forced turn-off signal fto outputted from the OR circuit OR1 is at the L level.

After this, when the resonance current detection signal at the IS terminal falls below the high-side threshold voltage Vthish, the comparator COMP3 outputs an L level signal. As a result, both the first reset input terminal R1 and the second reset input terminal R2 of the RS flip-flop RSFF1 become the L level. At this time, the resetting of the RS flip-flop RSFF1 is released and the RS flip-flop RSFF1 is set by the H level signal inputted into the set input terminal S, so that an H level signal is outputted at the output terminal Q. As a result, the OR circuit OR1 outputs an H-level forced turn-off signal fto, and the switch on/off control circuit 21 that receives the signal fto forcibly sets the high-side driving signal hi_pre, which is at the H-side at this timing, at the L level.

The forced turn-off signal fto that is at the H level becomes the L level at timing where the low-side driving signal lo_pre becomes the H level and the RS flip-flop RSFF1 is reset.

In the same way, when the high-side driving signal hi_pre is at the L level and the low-side driving signal lo_pre is at the H level, the resonance current detection signal at the IS terminal is lower than the threshold voltage Vthisl for the low side (note that the absolute value is larger than the absolute value of the threshold voltage Vthisl for the low side). Accordingly, the comparator COMP4 outputs an H level signal and resets the RS flip-flop RSFF2, and the D flip-flop DFF1 and the RS flip-flop RSFF1 are reset by the low-side driving signal lo_pre.

Here, when the resonance voltage detection signal at the VW terminal becomes higher than the threshold voltage Vthvwl, the output terminal of the comparator COMP2 becomes the H level. As a result, since the signal inputted into the clock input terminal C rises, the D flip-flop DFF2 latches the voltage VDD (an H level signal) at the timing of this rise and outputs an H level signal at the output terminal Q. Although this H level signal is inputted into the set input terminal S of the RS flip-flop RSFF2, since the RS flip-flop RSFF2 is preferentially reset by the output signal of the comparator COMP4, the output terminal Q of the RS flip-flop RSFF2 remains at the L level. Since the RS flip-flop RSFF1 is also reset by the low-side driving signal lo_pre, the output terminal Q of the RS flip-flop RSFF1 remains at the L level. Accordingly, the forced turn-off signal fto outputted from the OR circuit OR1 is at the L level.

After this, when the resonance current detection signal at the IS terminal becomes higher than the low-side threshold voltage Vthisl, the comparator COMP4 outputs an L level signal. As a result, both the first reset input terminal R1 and the second reset input terminal R2 of the RS flip-flop RSFF2 become the L level. At this time, since the H level signal is inputted into the set input terminal S, the RS flip-flop RSFF2 is set and outputs an H level signal at the output terminal Q. As a result, the OR circuit OR1 outputs an H-level forced turn-off signal fto, and the switch on/off control circuit 21 that has received the signal fto forcibly sets the low-side driving signal lo_pre, which is at the H-level at this timing, at the L level.

The forced turn-off signal fto that is at the H level becomes the L level at timing where the high-side driving signal hi_pre becomes the H level and the RS flip-flop RSFF2 is reset.

Note that during normal operation where off-resonance does not occur, the high-side driving signal hi_pre or the low-side driving signal lo_pre becomes high before the forced turn-off signal fto is outputted, which results in the D flip-flop DFF1 or DFF2 being reset once again and prevents the forced turn-off signal fto from being outputted.

At the forced turn-off control circuit 22, the high-side threshold voltage Vthish and the low-side threshold voltage Vthisl are varied in accordance with changes in the inputted DC voltage Vi while the operation described above is being repeatedly executed.

Figure 6:
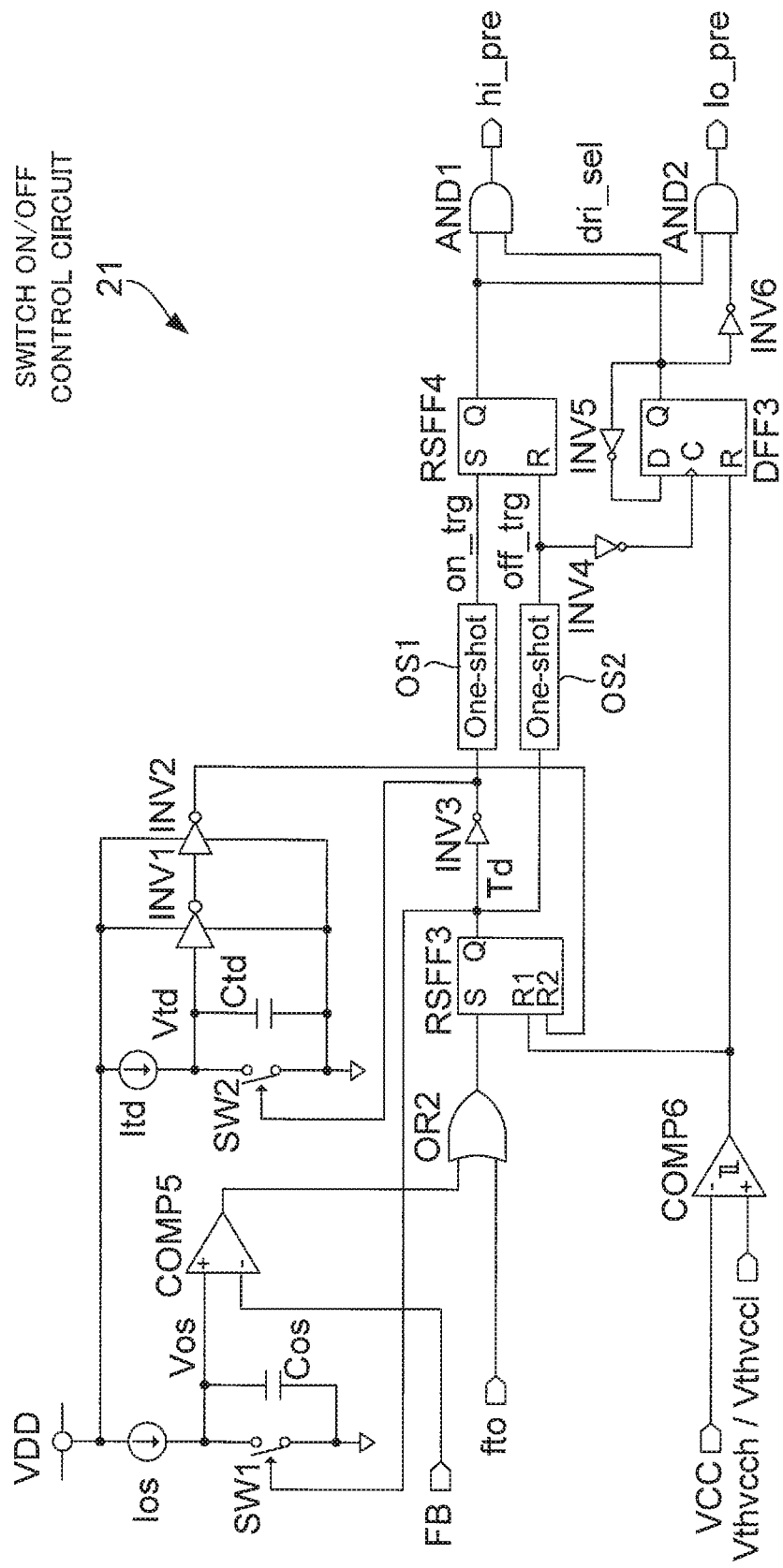
FIG. 6 is a circuit diagram depicting an example configuration of a switch on/off control circuit.
Figure 7:
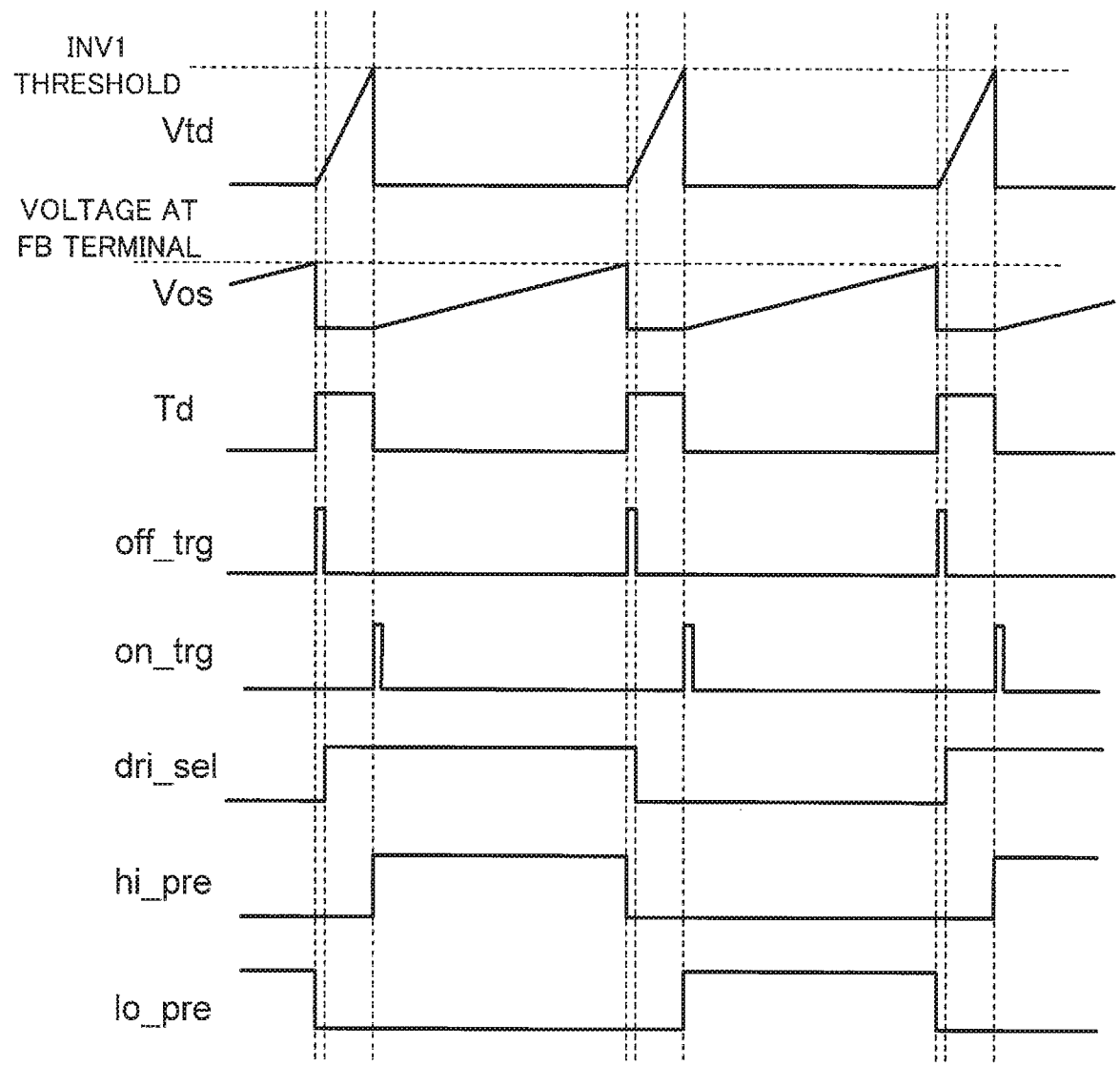
FIG. 7 is a timing chart indicating timing of turning off according to an FB terminal voltage.
Figure 8:
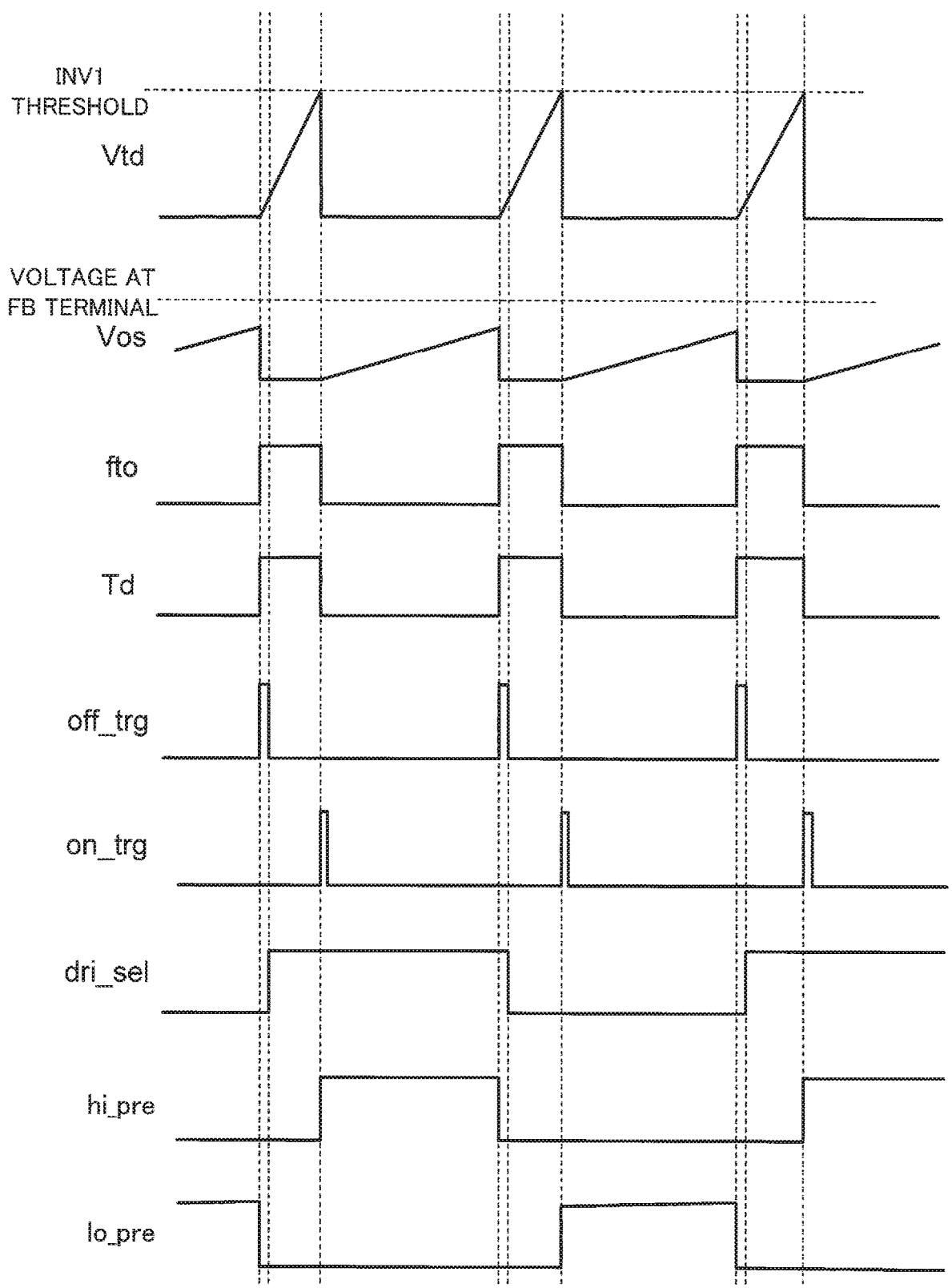
FIG. 8 is a timing chart indicating timing of forced turn-offs.

FIG. 6 is a circuit diagram depicting an example configuration of the switch on/off control circuit, FIG. 7 is a timing chart indicating the timing of turning off according to the FB terminal voltage, and FIG. 8 is a timing chart indicating the timing of forced turn-offs.

As depicted in FIG. 6, the FB terminal of the switch on/off control circuit 21 is connected to an inverting input terminal of a comparator COMP5. A non-inverting input terminal of the comparator COMP5 is connected to a connection point between one terminal of a constant current source Ios and one terminal of a capacitor Cos so as to receive a charging voltage Vos of the capacitor Cos. The other terminal of the constant current source Ios receives the voltage VDD, and the other terminal of the capacitor Cos is connected to ground. A switch SW1 is connected in parallel to the capacitor Cos. In this configuration, the comparator COMP5, the constant current source Ios, the capacitor Cos, and the switch SW1 form a circuit that determines the ON widths of the high-side driving signal hi_pre and the low-side driving signal lo_pre, which is to say, the turn-off timing.

The output terminal of the comparator COMP5 is connected to a first input terminal of an OR circuit OR2. A second input terminal of the OR circuit OR2 is connected to a terminal that receives the forced turn-off signal fto outputted from the forced turn-off control circuit 22. An output terminal of the OR circuit OR2 is connected to a set input terminal S of a reset priority RS flip-flop RSFF3.

The output terminal Q of the RS flip-flop RSFF3 is connected to a control input terminal of the switch SW1, an input terminal of an inverter circuit INV3, and an input terminal of a one-shot circuit OS2, and outputs a signal Td. An output terminal of the inverter circuit INV3 is connected to an input terminal of the one-shot circuit OS1.

An output terminal of the inverter circuit INV3 is connected to a control input terminal of the switch SW2. One terminal of the switch SW2 is connected to one terminal of a constant current source Itd, one terminal of a capacitor Ctd, and an input terminal of an inverter circuit INV1, so that the inverter circuit INV1 receives a charging voltage Vtd of the capacitor Ctd. The other terminal of the constant current source Itd receives the voltage VDD, and the other terminal of the capacitor Ctd and the other terminal of the switch SW2 are connected to ground. An output terminal of the inverter circuit INV1 is connected to an input terminal of the inverter circuit INV2, and an output terminal of the inverter circuit INV2 is connected to a second reset input terminal R2 of the RS flip-flop RSFF3. In this configuration, the constant current source Itd, the switch SW2, the capacitor Ctd, and the inverter circuits INV1 and INV2 form a circuit that decides the dead time, that is, the time from one of the high-side driving signal hi_pre and the low-side driving signal lo_pre being turned off (that is, becoming an L level signal) until the other signal is turned on (that is, becomes an H level signal).

A first reset input terminal R1 of the RS flip-flop RSFF3 is connected to an output terminal of a hysteresis comparator COMP6. An inverting input terminal of the hysteresis comparator COMP6 receives the power supply voltage VCC of the control IC 12, and a non-inverting input terminal of the hysteresis comparator COMP6 receives threshold voltages Vthvcch and Vthvccl. This hysteresis comparator COMP6 is a low voltage malfunction prevention (UVLO: Under Voltage Lock Out) circuit that prevents abnormal operations when the voltage VCC drops below a voltage on which internal circuitry of the control IC 12 may operate.

An output terminal of the one-shot circuit OS1 is connected to a set input terminal S of an RS flip-flop RSFF4, and outputs an on trigger signal on_trg that sets the RS flip-flop RSFF4. An output terminal of the one-shot circuit OS2 is connected to a reset input terminal R of the RS flip-flop RSFF4, and outputs an off trigger signal off_trg that resets the RS flip-flop RSFF4. The output terminal Q of the RS flip-flop RSFF4 is connected to first input terminals of the AND circuits AND1 and AND2.

The output terminal of the one-shot circuit OS2 is also connected to an input terminal of an inverter circuit INV4. The output terminal of the inverter circuit INV4 is connected to a clock input terminal C of a D flip-flop DFF3. An input terminal D of the D flip-flop DFF3 is connected to an output terminal of an inverter circuit INV5, and an input terminal of the inverter circuit INV5 is connected to an output terminal Q of the D flip-flop DFF3. The output terminal Q of the D flip-flop DFF3 is also connected to a second input terminal of the AND circuit AND1 and an input terminal of an inverter circuit INV6, and outputs a drive selection signal dri_sel. An output terminal of the inverter circuit INV6 is connected to a second input terminal of the AND circuit AND2. An output terminal of the AND circuit AND1 serves as the output terminal of the switch on/off control circuit 21 that outputs the high-side driving signal hi_pre. An output terminal of the AND circuit AND2 serves as the output terminal of the switch on/off control circuit 21 that outputs the low-side driving signal lo_pre. A reset input terminal R of the D flip-flop DFF3 is connected to an output terminal of the hysteresis comparator COMP6.

Next, the operation of the switch on/off control circuit 21 will be described with reference to FIG. 7. First, when the charging voltage Vos of the capacitor Cos becomes higher than the voltage at the FB terminal, the comparator COMP5 sets the RS flip-flop RSFF3 via the OR circuit OR2. As a result, an H level signal Td is outputted from the RS flip-flop RSFF3. The signal Td is inputted into the one-shot circuit OS2, and the one-shot circuit OS2 outputs an off trigger signal off_trg with a predetermined ON width that rises in synchronization with a rising edge in the signal Td. The off trigger signal off_trg resets the RS flip-flop RSFF4, and the RS flip-flop RSFF4 supplies an L level signal to the first input terminals of the AND circuits AND1 and AND2. As a result, the high-side driving signal hi_pre and the low-side driving signal lo_pre outputted from the AND circuits AND1 and AND2 become the L level.

When the signal Td becomes the H level, the switch SW1 is turned on (to become conductive), so that the charge in the capacitor Cos is discharged. Since the output of the inverter circuit INV3 also becomes the L level, the switch SW2 is turned off (to cut off the circuit), so that charging of the capacitor Ctd starts and the charging voltage Vtd rises. When the charging voltage Vtd rises and becomes higher than the threshold voltage of the inverter circuit INV1, the output of the inverter circuit INV1 becomes the L level and the output of the inverter circuit INV2 becomes the H level. This H level signal resets the RS flip-flop RSFF3, whose output signal Td changes to the L level. The L level signal Td is logically inverted by the inverter circuit INV3 and inputted into the one-shot circuit OS1. The one-shot circuit OS1 outputs the on trigger signal on_trg that has a predetermined ON width and rises in synchronization with a rising edge in the output signal of the inverter circuit INV3, that is, a falling edge in the signal Td. The on trigger signal on_trg sets the RS flip-flop RSFF4, and the RS flip-flop RSFF4 supplies an H level signal to the first input terminals of the AND circuits AND1 and AND2. As a result, the AND circuits AND1 and AND2 output the drive selection signal dri_sel inputted into the second input terminal or a signal produced by logical inversion of the drive selection signal dri_sel as the high-side driving signal hi_pre and the low-side driving signal lo_pre.

When the signal Td becomes the L level, the switch SW2 is turned on (to become conductive) to discharge the charge of the capacitor Ctd. In addition, the switch SW1 is turned off (to cut off the circuit), charging of the capacitor Cos starts, and the charging voltage Vos increases. At the timing where the charging voltage Vos reaches the voltage at the FB terminal, the output state of the comparator COMP5 is inverted, so that an H level signal is inputted into the set input terminal S of the RS flip-flop RSFF3. At this timing, since the second reset input terminal R2 of the RS flip-flop RSFF3 is at the L level, the RS flip-flop RSFF3 outputs an H level signal Td.

Due to the signal Td becoming the H level, the one-shot circuit OS2 outputs the off trigger signal off_trg. The off trigger signal off_trg is logically inverted by the inverter circuit INV4 and inputted into the clock input terminal C of the D flip-flop DFF3. Accordingly, the D flip-flop DFF3 latches the output state of the inverter circuit INV5 in synchronization with a falling edge in the off trigger signal off_trg. In other words, when the output state of the D flip-flop DFF3 is the L level, the H level signal is latched and the H level signal is outputted. Conversely, when the output state of the D flip-flop DFF3 is at the H level, an L level signal produced by logical inversion by the inverter circuit INV5 is latched, and the L level signal is outputted. The output signal of the D flip-flop DFF3 is inputted into the AND circuit AND1 as the drive selection signal dri_sel, and is outputted from the AND circuit AND1 as the high-side driving signal hi_pre. A signal produced by logical inversion by the inverter circuit INV6 of the drive selection signal dri_sel that is the output of the D flip-flop DFF3 is inputted into the AND circuit AND2 and is outputted from the AND circuit AND2 as the low-side driving signal lo_pre.

Note that when the hysteresis comparator COMP6 detects an abnormal drop in the voltage VCC, the hysteresis comparator COMP6 outputs an H level signal to forcibly reset the RS flip-flop RSFF3 and the D flip-flop DFF3.

Here, a case where the forced turn-off signal fto is inputted from the forced turn-off control circuit 22 will be described. The OR circuit OR2 receives a signal for controlling the ON width by way of the voltage of the FB terminal from the comparator COMP5 and the forced turn-off signal fto from the forced turn-off control circuit 22, and also receives a set signal into the RS flip-flop RSFF3. This means that the RS flip-flop RSFF3 is set in response to the first signal to become the H level out of the signal for controlling the ON width and the forced turn-off signal fto.

Here, when the forced turn-off signal fto is inputted before the charging voltage Vos of the capacitor Cos reaches the voltage of the FB terminal, the RS flip-flop RSFF3 outputs the signal Td that rises in synchronization with a rising edge of the forced turn-off signal fto. After this, the setting of the dead time and the turn-on timing are the same as during normal control, as depicted in FIG. 8.

Next, the level shift circuit 32 depicted in FIG. 3 will be described.

Figure 9:
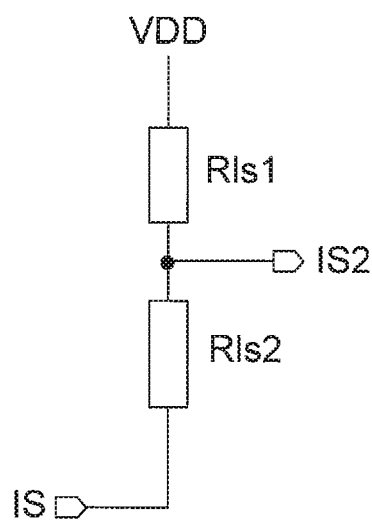
FIG. 9 is a circuit diagram depicting an example configuration of a level shift circuit.

FIG. 9 is a circuit diagram depicting an example configuration of a level shift circuit. First, the voltage inputted into the IS terminal is generated when a shunt current of the resonance current flows through the resistor Ris, and becomes positive or negative depending on the direction of the resonance current. Although a control IC 12 supplied with a negative voltage power supply would be able to cope with the inputting of a negative voltage, when no negative voltage power supply is provided, the control IC 12 will latch up when the input becomes a negative voltage. The level shift circuit 32 is configured so that the level of the voltage IS is shifted (upward) to produce a voltage IS2 that is always a positive voltage. This means that even when the control IC 12 is not supplied with a negative voltage power supply, the control IC 12 may still handle the voltage (as indicated as "IS") inputted into the IS terminal that may be positive or negative without a latch up occurring.

As depicted in FIG. 9, the level shift circuit 32 connects the IS terminal to an internal power supply of the voltage VDD via a series circuit composed of resistors Rls1 and Rls2, with a potential IS2 at a connection point between the resistors Rls1 and Rls2 as an output signal of the level shift circuit 32. Here, the voltage IS2 of the output signal is expressed by the equation below.

$$IS2 = \frac{Rls2}{Rls1 + Rls2} \cdot VDD + \frac{Rls1}{Rls1 + Rls2} \cdot IS \quad (7)$$

When the level shift circuit 32 is used, values obtained by substituting Vthish and Vthisl obtained by the above Equations (1) to (6) into IS in Equation (7) may be compared with IS2.

Also, since the resonance voltage detection signal inputted into the VW terminal is a voltage that may be positive or negative, when the control IC 12 is not capable of handling a negative voltage, in the same way as the IS terminal, it is sufficient to provide a level shift (level-up circuit) connected to the VW terminal and perform the same conversion as Equation (7) on the threshold voltage to be compared with the voltage at the VW terminal.

The control apparatus for a resonant converter with the above configuration has an advantage that by varying the absolute values of the first variable threshold and the second variable threshold, which are to be compared to a resonance current detection signal, according to the input voltage, it is possible to achieve a sufficient usable time at a low input voltage while realizing a function of preventing off-resonance when a high voltage is inputted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A control apparatus for a resonant converter that receives a direct current (DC) voltage of a bulk capacitor, the control apparatus comprising:
a forced turn-off control circuit that
receives a resonance current detection signal, which has been produced by shunting a resonance current flowing through the resonant converter and converting the shunted resonance current to a voltage,
outputs a forced turn-off signal in response to the resonance current detection signal falling between a first variable threshold and a second variable threshold that is smaller than the first variable threshold, and
varies the first variable threshold and the second variable threshold in accordance with an input voltage inputted to the forced turn-off control circuit by dividing the DC voltage of the bulk capacitor.

2. The control apparatus for the resonant converter according to claim 1,
wherein in a predetermined range of variation of the input voltage, the forced turn-off control circuit
sets the first variable threshold and the second variable threshold respectively at a first resonance current value and at a second resonance current value, which has an opposite sign to the first resonance current value, responsive to the input voltage being equal to or higher than a specified voltage, and
sets the first variable threshold and the second variable threshold respectively at a first current value with a lower absolute value than the first resonance current value and at a second current value with a lower absolute value than the second resonance current value, responsive to the input voltage falling below the specified voltage.

3. The control apparatus for the resonant converter according to claim 2,
wherein the forced turn-off control circuit sets a range in which absolute values of the first variable threshold and the second variable threshold vary to a range in which the resonant converter is capable of maintaining a predetermined operation.

4. The control apparatus for the resonant converter according to claim 2,
wherein the forced turn-off control circuit receives a resonance voltage detection signal produced by detecting a resonance voltage of the resonant converter, and validates outputting of the forced turn-off signal in response to the resonance voltage detection signal exceeding a first fixed threshold during a fall of the resonance voltage detection signal or in response to the resonance voltage detection signal exceeding a second fixed threshold during a rise of the resonance voltage detection signal.

5. The control apparatus for the resonant converter according to claim 4,
wherein the resonant converter is a DC-DC converter having a half-bridge circuit, the half-bridge circuit including a low-side switching element and a high-side switching element; and
wherein the forced turn-off control circuit includes:
a first comparator that compares the resonance voltage detection signal with the first fixed threshold;
a second comparator that compares the resonance voltage detection signal with the second fixed threshold;
a first delay (D) flip-flop that latches a high-level signal upon receipt of an output of the first comparator at a clock input of the first D flip-flop, and is reset by receiving a low-side driving signal that drives the low-side switching element of the half-bridge circuit;
a second D flip-flop that latches a high-level signal upon receipt of an output of the second comparator at a clock input of the second D flip-flop, and is reset by receiving a high-side driving signal that drives the high-side switching element of the half-bridge circuit;
a first reset-set (RS) flip-flop having a set input, a first reset input and a second reset input, the first RS flip-flop receiving an output of the first D flip-flop at the set input thereof and receives the low-side driving signal at the first reset input thereof;
a second RS flip-flop having a set input, a first reset input and a second reset input, the second RS flip-flop receiving an output of the second D flip-flop at the set input thereof and receives the high-side driving signal at the first reset input thereof;
an OR circuit that receives an output of the first RS flip-flop and an output of the second RS flip-flop, and outputs the forced turn-off signal;
an analog-to-digital converter that converts a signal obtained by dividing the input voltage to a digital signal;
a calculation unit that receives an output of the analog-to-digital converter and calculates a high-side threshold and a low-side threshold in accordance with the input voltage;
a third comparator that compares the resonance current detection signal with the high-side threshold and that has an output connected to the second reset input of the first RS flip-flop; and
a fourth comparator that compares the resonance current detection signal with the low-side threshold and that has an output connected to the second reset input of the second RS flip-flop.

6. The control apparatus for the resonant converter according to claim 1, further comprising a voltage detecting resistor and a level shift circuit, wherein
the resonance current detection signal is produced by passing a current, which is produced by shunting the resonance current flowing in the resonant converter, through the voltage detecting resistor and causing the level shift circuit to level-shift a voltage generated by the voltage detecting resistor.

7. The control apparatus for the resonant converter according to claim 6,
wherein the first variable threshold and the second variable threshold respectively correspond to values obtained by the level shift circuit level-shifting currents having a same absolute value but opposite signs.

* * * * *